United States Patent
Huber-Buschbeck et al.

(10) Patent No.: US 7,623,943 B2
(45) Date of Patent: Nov. 24, 2009

(54) METHODS AND SYSTEMS FOR PACK-SIZE-ORIENTED ROUNDING

(75) Inventors: Andreas Huber-Buschbeck, Heiligkreuzsteinach (DE); Hans-Ulrich Von Helmolt, Heidelberg (DE)

(73) Assignee: SAP AG, Walldorf (DE)

( * ) Notice: Subject to any disclaimer, the term of this patent is extended or adjusted under 35 U.S.C. 154(b) by 187 days.

(21) Appl. No.: 11/516,697

(22) Filed: Sep. 7, 2006

(65) Prior Publication Data

US 2007/0065979 A1     Mar. 22, 2007

(30) Foreign Application Priority Data

Sep. 7, 2005    (EP) .................................. 05108220

(51) Int. Cl.
- G06F 7/00 (2006.01)
- G06F 19/00 (2006.01)
- G06F 15/00 (2006.01)
- G06Q 10/00 (2006.01)

(52) U.S. Cl. .................. 700/214; 700/99; 700/223; 700/231; 700/236; 702/128; 414/901; 705/28

(58) Field of Classification Search .............. 700/28, 700/32, 49, 52, 95, 97, 99, 103, 104, 106, 700/121, 214, 216, 220, 222, 223, 231, 236, 700/244, 305; 702/82, 83, 128, 129; 377/6, 377/10, 13; 414/675, 901; 705/7, 8, 28, 705/29

See application file for complete search history.

(56) References Cited

U.S. PATENT DOCUMENTS

| | | | | |
|---|---|---|---|---|
| 4,749,008 A | * | 6/1988 | Whitney et al. | 141/1 |
| 5,607,642 A | * | 3/1997 | Lepper et al. | 422/62 |
| 5,699,259 A | * | 12/1997 | Colman et al. | 700/99 |
| 6,721,762 B1 | * | 4/2004 | Levine et al. | 707/104.1 |

* cited by examiner

*Primary Examiner*—Sean P Shechtman
(74) *Attorney, Agent, or Firm*—Finnegan, Henderson, Farabow, Garrett & Dunner, LLP

(57) ABSTRACT

Methods and systems are provided for packing a required quantity of products, wherein a plurality of different packages for packing the products and a plurality of packaging specifications comprising rounding rules are provided. In one implementation, a method is provided comprising determining a packaging specification out of a plurality of packaging specifications, extracting parameter values form the determined packaging specification and rounding, according to a predetermined packaging specification, the required quantity of products to a multiple of packages.

15 Claims, 3 Drawing Sheets

METHODS AND SYSTEMS FOR PACK-SIZE-ORIENTED ROUNDING

TECHNICAL FIELD

Embodiments consistent with the present invention relate generally to data processing methods and systems for managing inventory within, for example, one or more electronic or e-business systems that may comprise procurement systems, sales information systems, purchasing systems, logistic information systems and/or supply chain management systems. More particularly, embodiments consistent with the invention relate to methods and systems for optimizing a packaging process within a supply chain management system that can guarantee that the delivered quantity of products is only a multiple of given package sizes.

BACKGROUND INFORMATION

Today, the success of a business company depends essentially on the requirement that customer demands on goods and/or services be fulfilled precisely, cost-efficiently and in time. Therefore, many companies make use of supply chain management systems to control and optimize their production and delivery processes.

Supply chain management comprises the process of controlling the flow of goods, services, information and/or finances between the involved parties such as manufactures, suppliers, wholesalers, retailers, and consumers. This process may include, among others, order processing, information feedback, and timely delivering the ordered goods and/or services.

In current supply chain management systems demand-quantity-oriented rounding algorithms are used which round for higher pack level in very rough rounding steps. Such rounding algorithms round a given quantity of products to a multiple of packages whereby the rounding result is irrespective of the given quantity of products and the different package units. Demand-quantity-oriented rounding does not give the possibility to control the calculation of the rounding result.

SUMMARY

In accordance with the principles of the present invention, as embodied and broadly described herein, methods, systems and computer program products are provided for managing inventory.

According to one embodiment, a computer-implemented method is provided for packing a given quantity of products, wherein a plurality of different packages for packing the products and a plurality of packaging specifications are provided. The method may comprise determining at least one packaging specification out of the plurality of packaging specifications, extracting rounding parameters from the at least one determined packaging specification, and rounding, according to a predetermined packaging specification, the given quantity of products to a multiple of packages.

Consistent with one embodiment, for different package sizes, different tolerance values may be defined. According to a rounding rule and one or more tolerance values, a rounding process may be performed in order to round a given quantity of products to a multiple of packages.

In one embodiment, the rounding comprises at least a package-rounding-process and a tolerance-rounding-process, whereby the package-rounding-process comprises rounding the given quantity to a multiple of the smallest package size, and whereby the tolerance-rounding-process comprises rounding the given quantity to a predetermined package size.

The rounding process may be dependent on the required quantity of products. If the required quantity of products is within a tolerance interval which is given by the tolerance values, the rounding process performs a tolerance-rounding-process. Otherwise, the rounding process performs a package-rounding-process.

A packaging specification may be stored in a data structure. Further, tolerance intervals may be determined which define upper and/or lower bounds around the package sizes for packages larger then the smallest package. For the smallest package unit no intervals may be defined. Therefore, for the smallest package unit the package-rounding-process is performed.

In one embodiment, the tolerance-rounding-process is performed if the determined packaging specification comprises valid tolerance values and the given quantity is within one of the tolerance intervals defined by the tolerance values.

The package-rounding-process may be performed if the determined packaging specification comprises invalid tolerance values.

In another embodiment, the package-rounding-process may be performed if the determined packaging specification comprises valid tolerances and the given quantity is out of the tolerance intervals defined by the tolerance values.

One advantage is that by defining the width of an interval it may be controlled which rounding process has to be performed.

In another embodiment, the rounding rules may comprise at least one of a rounding-down rule, a rounding-up rule, and a rounding-to-the-nearest rule.

Furthermore, the given quantity is rounded up to the smallest package size if the quantity is smaller than the smallest package size.

Therefore, methods consistent with the present invention can avoid a situation where single pieces products are delivered.

In one embodiment of the invention, a method is provided that comprises the following steps: a first step of determining a valid packaging specification out of the plurality of packaging specifications, a second step of determining tolerance values from the packaging specification, a third step of evaluating as to whether the tolerance values are valid, a fourth step of performing the package-rounding-process according to the packaging specification if the tolerance intervals are invalid, a fifth step of determining the tolerance intervals given by the tolerance values if the tolerance values are valid, a sixth step of checking as to whether the given quantity is within one of the determined tolerance intervals, a seventh step of performing the tolerance-rounding-process according to the packaging specification if the given quantity is within one of the determined tolerance intervals, and an eighth step of performing the package-rounding-process according to the packaging specification if the given quantity is out of the determined tolerance intervals.

Further, the method may comprise the steps of: rounding, according to a predetermined packaging specification, the given quantity of products to a multiple of packages, checking availability of the rounded quantity of products, and rounding, according to the predetermined packaging specification, the available quantity of products to a multiple of packages.

Furthermore, embodiments of the invention relate to a system, the system comprising: a data storage device which stores a plurality of packaging specifications, means for determining a valid packaging specification, means for extracting rounding parameters form a packaging specification, and means for performing a rounding process. The means for performing a rounding process may be adapted to perform the following steps: determining the tolerance values from the packaging specification, evaluating as to whether the tolerance values are valid, performing the package-rounding-process according to the packaging specification if the tolerance values are invalid, determining the tolerance interval given by the tolerance values, if the tolerance values are valid, checking as to whether the given quantity to round is within the determined tolerance interval, performing the tolerance-rounding-process according to the packaging specification, if the given quantity to round is within the determined tolerance interval, and performing the package-rounding-process according to the packaging specification, if the given quantity to round is out of the determined tolerance interval.

Embodiments of the invention additionally comprise computer-readable storage media comprising program code for performing the inventive methods, when loaded into a computer-system or executed by a processor.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts.

In a supply chain management system rounding with availability check confirms multiples of package size to guarantee that the delivered quantity is only a multiple given of package sizes. Using only a multiple of packages, the packaging and the transportation may be better optimized.

Figure 1:
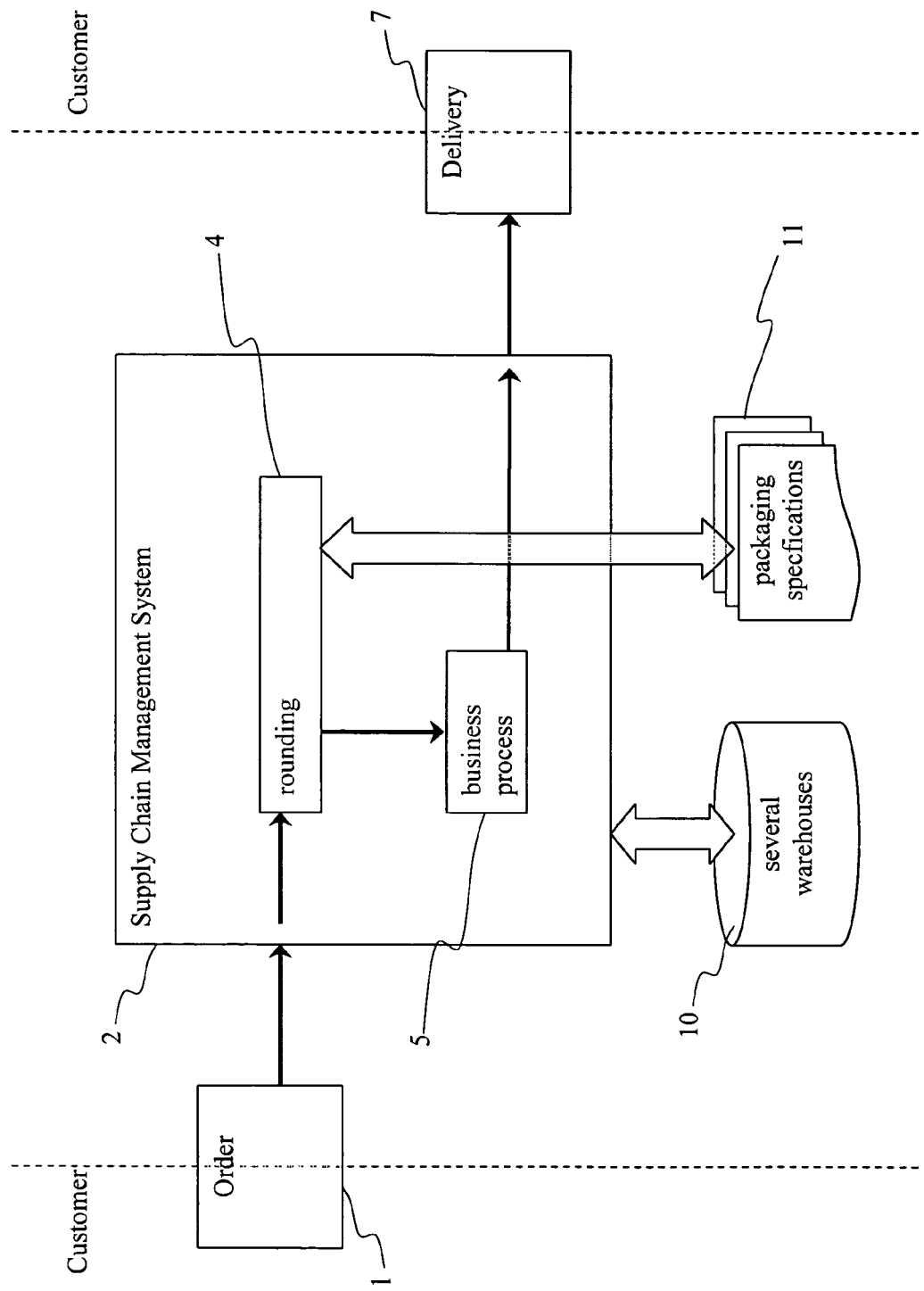
FIG. 1 illustrates an embodiment of an exemplary sourcing process of goods or products using a rounding method within the supply chain management system, consistent with an embodiment of the invention.

FIG. 1 shows an exemplary sourcing process of products, consistent with an embodiment of the invention. The customer sends an order 1 to the dealer. The order 1 may be in the form of an electronic order transmitted by email or a traditional order transmitted by mail. The order comprises at least information about the ordered product and the ordered quantity. The dealer feeds the data about the order 1 into the supply chain management system 2 which processes this order 1 and provides information for the delivery step 7.

The supply chain management system 2, in this embodiment may perform a rounding process 4 followed by a business process 5, whereby the business process 5 uses the results of the rounding process 4. The business process 5 may be an availability check or an deployment process or stock transfer of goods or any other processes within a supply chain management system which need a rounded result of a given quantity of goods.

If the business process 2 is an availability check, the availability check of a required quantity of products verifies whether the required quantity of products is available in one or more warehouses 10. The warehouses may comprise several sub-warehouses at different locations, whereby the products located in these warehouses are managed within the supply chain management system 2.

In order to perform the rounding process 4, the supply chain management system 2, or in other embodiments the rounding process 4, may determine a valid packaging specification out of a plurality of packaging specifications 11. The packaging specifications may be stored within the supply chain management system 2, and the supply chain management system 2 may provide different packaging specifications 11 for different warehouses.

In one embodiment, the quantity of the products to be delivered is calculated by the supply chain management system 2 in consideration of several packaging specification 11.

The sourcing process ends by delivering 7 the products to the customer.

Figure 2:
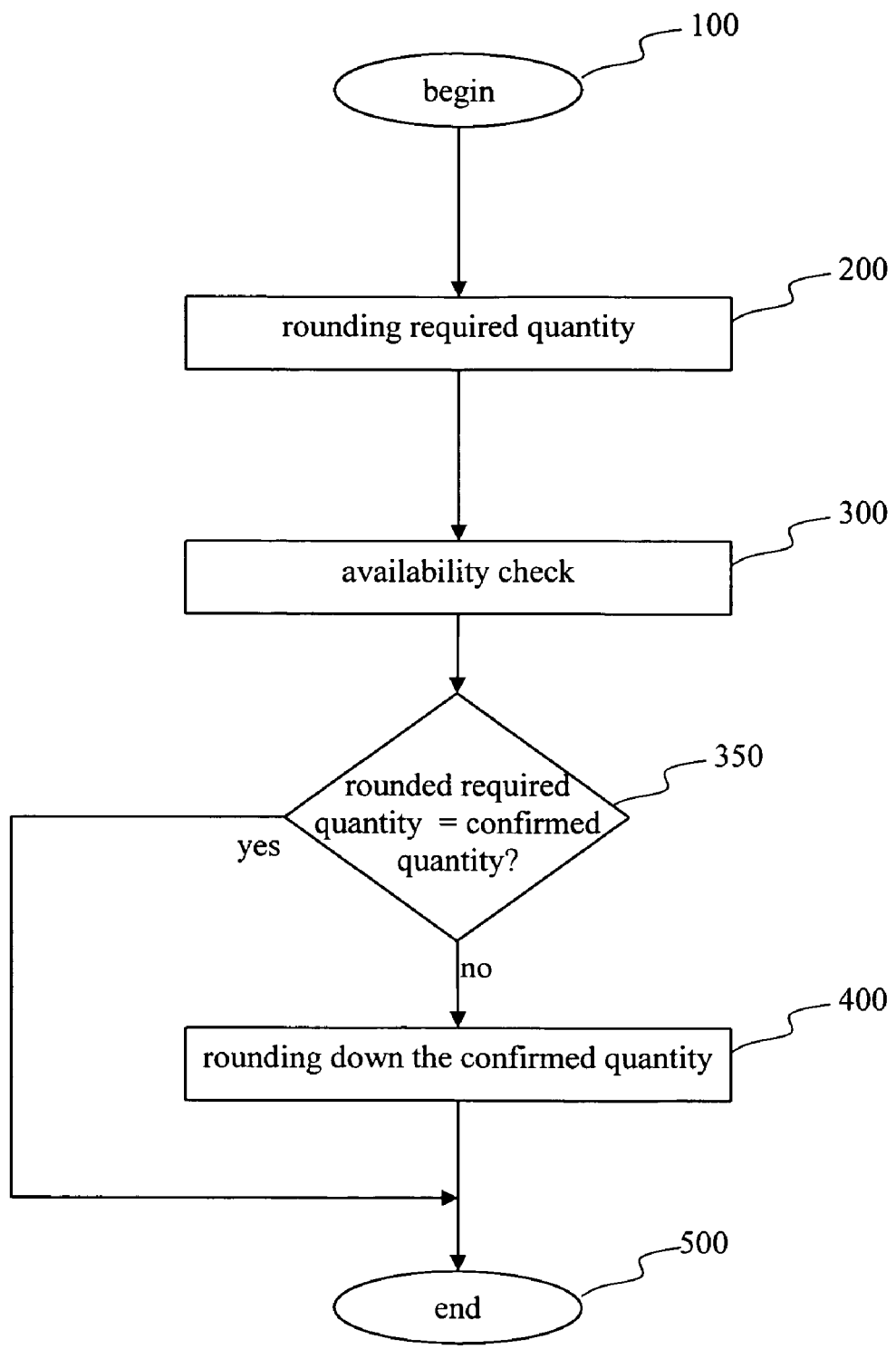
FIG. 2 illustrates a flowchart of an exemplary method with an availability check, consistent with an embodiment of the invention.

FIG. 2 is a flowchart for an exemplary method with an availability check, for example, consistent with an embodiment of the invention. In one embodiment, the process is called by an external computer system. The external system may be a customer relationship management system.

The process, starting with step 100, receives from the calling system the originally required quantity. The originally required quantity, which is the quantity to round, is rounded in step 200 according to the parameters of a valid packaging specification, for example.

The following step 300 performs an availability check of the rounded required quantity. In the next step 350, the availability of the rounded required quantity on stock is checked by comparing the rounded required quantity with the confirmed quantity of the availability check. If the rounded required quantity equals the confirmed quantity, the method ends with step 500.

Otherwise, if the rounded required quantity is not equal to the confirmed quantity, the method proceeds with step 400 by rounding down the confirmed quantity even if in the packaging specification a rounding up rule is defined.

In one embodiment, step 200 of FIG. 2 is executed before any availability check. The method ends with step 500, wherein the rounded required quantity and the rounded confirmed quantity are returned to the calling system. The calling system has to handle the difference between the rounded confirmed quantity and the original required quantity.

In other embodiments, where a plurality of product locations are defined, the method as described above, is repeated for each product location until the requirement is completely confirmed or no further product locations are available. In this case, the method may confirm for each product location only a part of the rounded required quantity whereby the method may consider different packaging specifications for each product location. If the required quantity should be delivered completely from one location, the whole required quantity is checked against the quantity on stock of each location.

If the method does not confirm the complete original required quantity, in the last step 500, the remaining requirement for the last location is returned to the calling system.

In other embodiments, instead of the steps 300, 350 and 400, other processes may be performed, e.g., the above mentioned deployment process or stock transfer of goods.

Figure 3:
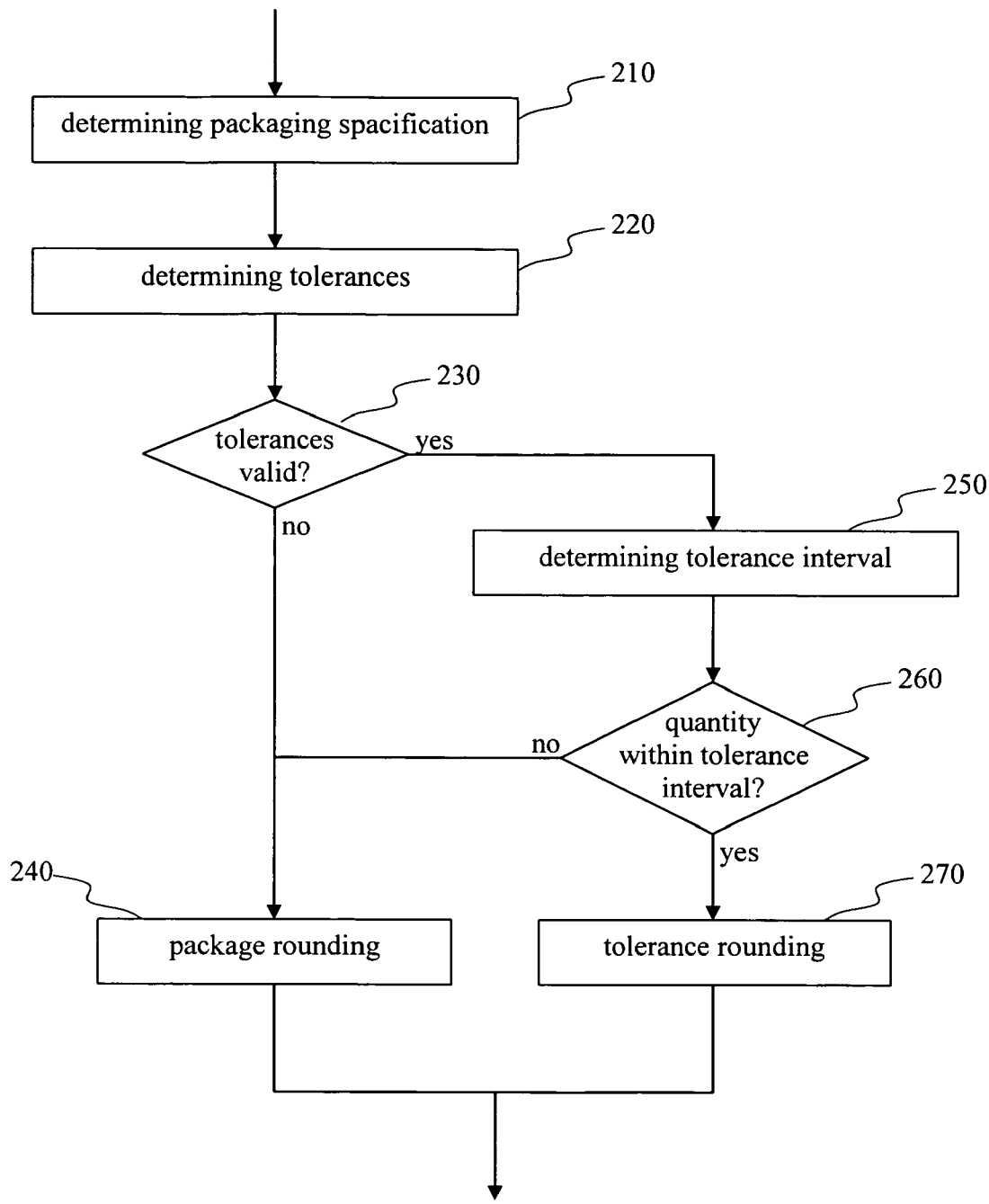
FIG. 3 illustrates an exemplary method for implementing a packet size oriented rounding algorithm, consistent with an embodiment of the invention.

FIG. 3 shows an exemplary method for implementing the rounding step 200 of FIG. 2. In a first step 210, the packaging specification is determined. The packaging specification may hold all data for packaging and rounding, such as: package units, package size, tolerance values (up and/or down tolerances), and rounding rule (up/down/to the nearest).

In one embodiment, a package unit defines the unit for packages, e.g., carton or pallet. The package size defines the number of pieces which are packed into a package, e.g., one carton contains ten pieces or one pallet contains hundred pieces. The tolerance values define an interval around the package size of a package unit. If the ordered quantity of products is within such an interval, the rounding process rounds the ordered quantity of products to the package size of the corresponding package unit. For example, if the package unit is one pallet containing 100 pieces and the tolerance interval for this package unit is [90 pieces; 110 pieces], then the rounding process rounds the ordered quantity of products to 100 pieces if the ordered quantity of products is within 90 pieces and 110 pieces.

A rounding rule may define how the rounding has to be performed by the rounding process. In one embodiment, three rounding rules are defined: rounding up, rounding down, and rounding to the nearest. "Rounding up" means to round up the ordered quantity of products to the next larger multiple of the smallest package size, "rounding down" means to round down the ordered quantity of products to the next smaller multiple of the smallest package size, and "rounding to the nearest" means to round the ordered quantity of products to the nearest multiple of the smallest package size. For example, the smallest package size is 10 pieces. Then, a number of 38 pieces is rounded as follows:

rounding down→30 pieces (30 is the next smaller multiple of 10)
rounding up→30 pieces (40 is the next larger multiple of 10)
rounding to the nearest→40 pieces (40 is the nearest multiple of 10)

TABLE 1

An Exemplary Packaging Specification

| Package Unit | Package Size | Tolerance Value | Rounding Rule |
|---|---|---|---|
| 1 package | 2 pieces | | up |
| 1 carton | 5 packages = 10 pieces | ±20% (±2 pieces) | |
| 1 pallet | 10 cartons = 100 pieces | ±10% (±10 pieces) | |

As illustrated in the above exemplary table, one package contains two pieces. For the package unit, package tolerance values are not allowed. The rounding rule is defined as "rounding up" and in this packaging specification, the package unit "package" is the smallest package unit.

The next level of packing unit is the carton. In this example, one carton contains five packages whereby each package contains two pieces. The tolerance values for this package unit are defined as ±20% (±2 pieces). The resulting tolerance interval for the package unit "one carton" is [8 pieces; 12 pieces].

The next level of package unit is the pallet. In this example, one pallet contains ten cartons whereby each carton contains ten pieces. The tolerance values for the package unit "pallet" are defined as ±10% (±10 pieces). The resulting tolerance interval for the package unit "pallet" is therefore [90 pieces; 110 pieces].

For the package unit "carton" and "pallet" rounding rules are not allowed and, therefore, not defined.

The following step 220 reads the tolerance values from the packaging specification and checked in the next step 230 as to whether they are valid or not. In one embodiment, tolerances for the smallest packet unit are not allowed and, therefore, are not valid. If no tolerances are defined or the tolerances are not valid, the method continues with step 240 performing the package rounding method. Otherwise, the method continues with step 250. In step 250, the tolerance interval is determined. The tolerance intervals are defined as percentage values, which define upper and/or lower bound values of the interval around the packet size of the package units. In other embodiments, absolute values for the tolerance intervals may be defined.

If only the upper bound is defined, the lower bound is given by the package size of the respective package unit. In the other case, where only the lower bound is defined, the upper bound is also given by the package size of the respective package unit.

TABLE 2

An Exemplary Packaging Specification Using Only Upper and Lower Bounds for Tolerances

| Package Unit | Package Size | Tolerance Value | Rounding Rule |
|---|---|---|---|
| 1 package | 2 pieces | | up |
| 1 carton | 5 packages = 10 pieces | +20% (+2 pieces) | |
| 1 pallet | 10 cartons = 100 pieces | −10% (−10 pieces) | |

The tolerance interval for the package unit "1 carton" is [10 pieces; 12 pieces] whereby the lower bound (10 pieces) is given by the package size of 10 pieces. The tolerance interval for the package unit "1 pallet" is [90 pieces; 100 pieces] whereby the upper bound (100 pieces) is given by the package size of 100 pieces. For the smallest package unit "package," tolerance values are not allowed, therefore no tolerance interval can be calculated.

In the next step 260, the originally required quantity is checked as to whether it is within the tolerance interval or not. If the originally required quantity is not within the tolerance interval, package rounding 240 is performed. Otherwise tolerance rounding 270 is performed.

The following examples will demonstrate the behavior of the package rounding and the tolerance rounding.

EXAMPLE 1

Package Rounding

For the first example, the packaging specification holds the following data:

| package size: 6/12/18 pieces |
| rounding rule: up |
| tolerances: none |

| Quantity to Round | Rounded Quantity |
|---|---|
| 8 | 12 |

The quantity to round (first column) is 8 pieces. The quantity to round is rounded up to 12 pieces (second column) according to the packaging specification.

EXAMPLE 2

Package Rounding

The packaging specification for the second example holds the following data:

| package size: 6/12/18 pieces |
| rounding rule: down |
| tolerances: none |

| Quantity to Round | Rounded Quantity |
|---|---|
| 20 round down to | 18 |

The quantity to round is 20 pieces. The quantity to round is rounded down to 18 pieces according to the packaging specification.

EXAMPLE 3

Tolerance Rounding

For the third example, the packaging specification holds the following data:

| Package Size | Tolerances | Rounding Rule |
|---|---|---|
| 10 | | down |
| 100 | ±5% (±5 units) | |
| 1000 | ±2% (±20 units) | |

| Quantity to Round | Rounded Quantity |
|---|---|
| 96 | 100 |

In the first step, the tolerance intervals, which are [95; 105] for package size 100 and [980; 1020] for package size 1000, are determined. For the smallest package size 10, no tolerances are defined. The quantity to round of 96 pieces is within the interval [95; 105], and therefore it will be rounded to the given package size 100. the process begins by checking the tolerance interval of the largest package size 1000. If the quantity to round is below the tolerance interval the process continues by checking the tolerance interval of the next smaller package size 100. In this example, the process needs two steps for determining the correct package size and tolerance interval.

EXAMPLE 4

Tolerance Rounding (Out of Range of Tolerances)

For the fourth example, the packaging specification holds the following data:

| Package Size | Tolerances | Rounding Rule |
|---|---|---|
| 10 | | Down |
| 100 | ±5% (±5 units) | |
| 1000 | ±2% (±20 units) | |

| Quantity to Round | Rounded Quantity |
|---|---|
| 76 | 70 |

In the first step, the tolerance intervals, which are the same as in Example 3, are determined. Like in Example 3, the process begins by checking the tolerance interval of the largest package size 1000. Because the quantity to round 76 is below the tolerance interval [980; 1020], the method performs a second step by checking the quantity to round 76 against the tolerance interval [95; 105] of the next smaller package size 100. The required quantity is also below the second checked tolerance intervals [95; 105] and, therefore, the package rounding method will be done, because for the next smaller package size no tolerances are defined and for the smallest package size tolerances are not allowed. This leads to a rounded quantity of 70 pieces. The package rounding method rounds always to a multiple of the smallest package size and 70 pieces is the next multiple of 10 pieces according to the rounding-down rule.

The up/down rule refers to the smallest package size. In other embodiments, a smallest selling package size may be defined, which may be larger than the smallest non selling package size. This information has to be part of the packaging specification.

TABLE 3

An Exemplary Packaging Specification Using a Smallest Selling Package Size Larger than the Smallest Non Selling Package Size

| Package Size | Tolerances | Smallest Selling Package Size | Rounding Rule |
|---|---|---|---|
| 10 | | | |
| 100 | | | |
| 1000 | | X | up |
| 5000 | ±1% (±50) | | |
| 10000 | ±0.5% (±50) | | |

In this case, the process for checking the tolerance intervals ends at the package size 1000, whereby for the package size 1000 the tolerances are not used within the tolerance rounding method. If the package rounding method has to be performed, because the required quantity is outside of any tolerance intervals, the package rounding method rounds to a multiple of the smallest selling package size 1000. The package sizes 10 and 100 are not considered by the rounding process. In this case, the up/down rule refers to the smallest sellable package size 1000.

The present techniques and above-described embodiments can be implemented in digital electronic circuitry, or in computer hardware, firmware, software, or in combinations of them. Systems consistent with the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which includes at least one programmable processor coupled to receive data from, and transmit data to, a storage system, at least one input device, and at least one output device, respectively. Computer programs may be implemented in a high-level or object-oriented programming language, and/or in assembly or machine code. The language or code can be a compiled or interpreted language or code. Processors may include general and special purpose microprocessors. A processor receives instructions and data from memories, in particular from read-only memories and/or random access memories. A computer may include one or more mass storage devices for storing data; such devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits).

The computer systems or distributed computer networks as mentioned above may be used, for example, for producing goods, delivering parts for assembling products, controlling technical or economical processes, or implementing telecommunication activities.

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller is coupled to a hard disk drive suitable for storing executable computer programs, including programs embodying the present technique. The I/O controller is coupled by means of an I/O bus to an I/O interface. The I/O interface receives and transmits in analogue or digital form over at least one communication link. Such a communication link may be a serial link, a parallel link, local area network, or wireless link (e.g., an RF communication link). A display is coupled to an interface, which is coupled to an I/O bus. A keyboard and pointing device are also coupled to the I/O bus. Alternatively, separate buses may be used for the keyboard, pointing device and I/O interface.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for packing a given quantity of products, wherein a plurality of different packages for packing the products and a plurality of packaging specifications are provided, the method comprising:
   determining at least one packaging specification out of the plurality of packaging specifications;
   extracting rounding parameters from the at least one determined packaging specification;
   determining tolerance values from the packaging specification;
   rounding, by a computer system according to the extracted rounding parameters, the given quantity of products to a rounded quantity of products when the tolerance values are invalid,
   wherein the rounded quantity of products is a multiple of packages of a smallest package size;
   determining tolerance intervals given by the tolerance values if the tolerance values are valid:
   checking as to whether the given quantity is within one of the tolerance intervals:
   rounding, by the computer system, the given quantity of products to a predetermined package size when the given quantity is within one of the tolerance intervals; and
   rounding, by the computer system, the given quantity of products according to the packaging specification when the given quantity is out of the tolerance intervals.

2. The method of claim 1, wherein each of the packaging specifications comprises:
   at least one rounding rule; and
   a plurality of different package sizes.

3. The method of claim 1, wherein data structures are stored as one or more in time series.

4. The method of claim 2, wherein tolerance intervals are determined which define at least one of an upper bound and a lower bound around the package sizes for packages larger then the smallest package.

5. The method of claim 2, wherein the rounding rule comprises at least one of a rounding-down rule, a rounding-up rule, and a rounding-to-the-nearest rule.

6. The method of claim 1, wherein the rounding comprises rounding the given quantity up to a smallest package size when the quantity is smaller than the smallest package size.

7. The method of claim 1, further comprising checking the availability of the rounded quantity of products after the rounding of the given quantity of products.

8. A method for packing a given quantity of products, wherein a plurality of different packages for packing the products and a plurality of packaging specifications are provided, the method comprising:
   determining a valid packaging specification out of the plurality of packaging specifications;
   extracting rounding parameters from the packaging specification;
   determining tolerance values from the packaging specification;
   evaluating as to whether the tolerance values are valid;
   performing, by a computer system a package-rounding-process according to the packaging specification when the tolerance values are invalid, wherein the package-rounding-process comprises rounding the given quantity of products to a multiple of a smallest package size;
   determining tolerance intervals given by the tolerance values if the tolerance values are valid;

checking as to whether the given quantity is within one of the tolerance intervals;

performing, by the computer system a tolerance-rounding-process according to the packaging specification when the given quantity is within one of the tolerance intervals, wherein the tolerance-rounding-process comprises rounding the given quantity of products to a predetermined package size; and performing, by the computer system the package-rounding-process according to the packaging specification when the given quantity is out of the tolerance intervals.

9. The method of claim 8, further comprising:

rounding, according to a determined packaging specification, the given quantity of products to a rounded quantity of products, wherein the rounded quantity of products is a multiple of packages;

checking availability of the rounded quantity of products; and rounding, according to the determined packaging specification, the rounded quantity of products to a second rounded quantity of products, wherein the second quantity of products is a multiple of packages.

10. A computer system comprising:

an input device for receiving a given quantity of products;

a data storage device for storing a plurality of packaging specifications; and a processor for determining a valid packaging specification out of a plurality of packaging specifications, for extracting rounding parameters from the at least one determined packaging specification, for rounding the given quantity of products to a rounded quantity of products, wherein the rounded quantity of products is a multiple of packages, and for checking availability of the rounded quantity of products after the rounding of the given quantity of products, wherein the rounding comprises:

determining tolerance values from the packaging specification, evaluating as to whether the tolerance values are valid, performing a package-rounding-process according to the packaging specification when the tolerance values are invalid, wherein the package-rounding-process comprises rounding the given quantity of products to a multiple of a smallest package size, determining a tolerance interval based on the tolerance values, if the tolerance values are valid, checking as to whether a given quantity to round is within the tolerance interval, performing a tolerance-rounding-process according to the packaging specification when the given quantity to round is within the determined tolerance interval, wherein the tolerance-rounding-process comprises rounding the given quantity of products to a predetermined package size, and performing the package-rounding-process according to the packaging specification when the given quantity to round is out of the determined tolerance interval.

11. A computer-readable medium comprising computer-executable instructions for performing a method for packing a given quantity of products, when loaded into a computer system, wherein a plurality of different packages for packing the products and a plurality of packaging specifications are provided, the method comprising:

determining at least one packaging specification out of the plurality of packaging specifications;

extracting rounding parameters from the at least one determined packaging specification;

determining tolerance values from the packaging specification;

rounding, according to the extracted rounding parameters, the given quantity of products to a rounded quantity of products when the tolerance values are invalid, wherein the rounded quantity of products is a multiple of packages of a smallest package size;

determining tolerance intervals given by the tolerance values if the tolerance values are valid;

checking as to whether the given quantity is within one of the tolerance intervals;

rounding the given quantity of products to a predetermined package size when the given quantity is within one of the tolerance intervals; and rounding the given quantity of products according to the packaging specification when the given quantity is out of the tolerance intervals.

12. The computer-readable medium of claim 11, wherein each of the packaging specifications comprises:

at least one rounding rule; and a plurality of different package sizes.

13. The computer-readable medium of claim 12, wherein the rounding rule comprises at least one of a rounding-down rule, a rounding-up rule, and a rounding-to-the-nearest rule.

14. The computer-readable medium of claim 11, wherein the rounding comprises rounding the given quantity up to a smallest package size when the quantity is smaller than the smallest package size.

15. The computer-readable medium of claim 11, wherein the method further comprises checking the availability of the rounded quantity of products after the rounding of the given quantity of products.

* * * * *